Figure 1:
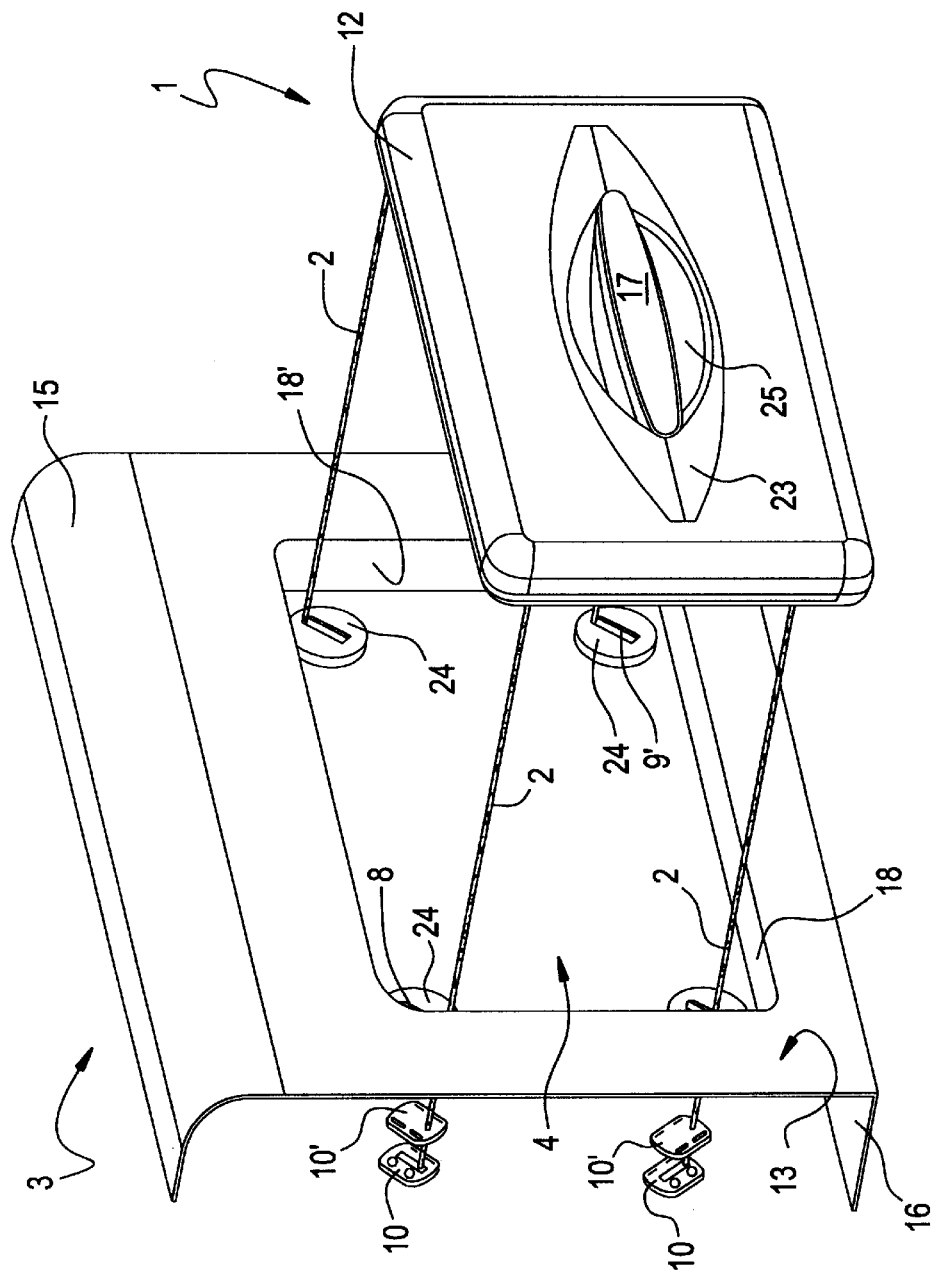

United States Patent [19]
Labeur

[11] Patent Number: 6,003,926
[45] Date of Patent: Dec. 21, 1999

[54] STOWING AID

[75] Inventor: Lucas Labeur, Kessel-lo, Belgium

[73] Assignee: Peter Butz GmbH & Co. Verwaltungs-KG, Germany

[21] Appl. No.: 08/814,197

[22] Filed: Mar. 10, 1997

[30]   Foreign Application Priority Data

Mar. 12, 1996 [DE] Germany ............................ 196 09 542

[51] Int. Cl.⁶ .................................................... B60R 5/00
[52] U.S. Cl. .................. 296/37.8; 296/37.13; 296/37.12; 224/572; 224/549; 224/552; 224/554
[58] Field of Search ............................... 296/37.8, 37.12, 296/37.13, 37.15, 37.16; 224/572, 567, 570, 560, 548, 549, 552, 554

[56]   References Cited

U.S. PATENT DOCUMENTS

| | | | |
|---|---|---|---|
| 3,088,771 | 5/1963 | Weigle | 296/37.15 X |
| 3,730,581 | 5/1973 | Parkinson | 296/37.13 |
| 4,239,277 | 12/1980 | Oda | 296/37.12 |

*Primary Examiner*—Joseph D. Pape
*Attorney, Agent, or Firm*—Michael L. Dunn

[57]   ABSTRACT

A stowing aid for the interior of motor vehicles. The stowing aid includes a retaining plate which is connected with elastic elements, usually in the form of cables, near the periphery of the retaining plate. The elastic elements are also connected to a fastening element attachable in the interior of the motor vehicle so that the elastic elements pull the retaining plate toward the fastening element. The fastening element is provided with a recess for receiving the retaining plate.

23 Claims, 2 Drawing Sheets

STOWING AID

The present invention relates to a stowing aid for the interior of motor vehicles, with a retaining plate which is joined by means of a plurality of elastic elements, which are arranged at least in part in the proximity of the periphery of the retaining plate, to a fastening element fixed in the interior of the motor vehicle, towards which the retaining plate is pulled by means of the tensile force of the elastic elements.

Stowing aids of this type are already known per se, wherein within the meaning of the present invention, the term "retaining plate" is to be taken very broadly, and includes any more or less rigid, two-dimensional configurations, in particular also frames or screens.

The known stowing aids either have the disadvantage that they project into the interior of the motor vehicle, even when no large items are to be retained by the stowing aid, or they are relatively unattractive as they are additional and subsequently fitted parts, and they appear alien or are not made a suitable size for their function as stowing aids as they cannot hold several items simultaneously, particularly when these are relatively smooth items stacked one on top of another such as, for example, two or three books. In addition, in certain circumstances known stowing aids sometimes also have several of the disadvantages described here.

The object of the present invention is to provide a stowing aid which, compared to this prior art, can be better suited optically to the interior of the motor vehicle, and holds the items to be held by the stowing aid more securely than is the case with known stowing aids.

This object is solved with respect to the stowing aid described in the introduction in that the fastening element is provided with a recess for receiving the retaining plate. This means that the retaining plate is drawn by the elastic elements into the recess, whereby the retaining plate projects less, or not at all, into the interior of the motor vehicle, and wherein additionally items to be held can be placed in the recess and held by means of the retaining plate, and cannot slip out because of being contained in the recess.

An embodiment of the invention is particularly preferred wherein the depth of the recess is matched to the depth of the retaining plate such that the latter terminates substantially flush with the external surface of the fastening element, at least when no thicker items are held in the recess by the retaining plate.

With this, the stowing aid fits onto the surface of a corresponding fastening element in an optically attractive manner, wherein in a particularly preferred embodiment of the invention the surface of the fastening element also terminates flush with the inside walls or lining of the motor vehicle, in that it is set into corresponding linings or is configured integrally with such an interior lining. As the interior linings are often provided with a certain degree of padding, the surfaces of the fastening element and/or retaining plate can also be produced from a corresponding material and provided with padding.

In another embodiment of the invention, that is to say with a non-integral configuration with the internal lining elements of the motor vehicle, the fastening element has the form of a plate which is angled towards one side on two opposite edges, and which is provided with a recess configured as a cavity. A cavity is understood to be a recess which is provided with a base or bottom integral with the fastening element.

With this, the length of the angled edge sections, measured perpendicularly with respect to the plate surface of the fastening element, should be greater than the depth of the cavity. In concrete terms, this means that when the ends of the angled edge sections are placed on a more or less planar internal wall of a motor vehicle, the base or bottom of the cavity still maintains a certain distance from the internal wall of the motor vehicle. The reason for this measure will be explained later.

Furthermore, an embodiment of the invention is preferred in which the retaining plate is configured as a closed housing which serves as a stowing space for each section of the elastic elements.

With this, the elastic elements are preferably cables which are guided over rollers into the housing. It is also advantageous when one end of a cable is lead from the housing from one of two apertures at a distance apart and is fixed to or in the proximity of the fastening element, wherein in the interior of the retaining plate housing the cable concerned runs between the two housing apertures over rollers, and preferably with several changes in direction. An elastic cable guided over rollers in the housing of the retaining plate permits the pulling away of the retaining plate from the fastening element by a relatively large distance, as the possible change in length of the elastic cable, which is proportional to the total length of the cable, is distributed only on the two cable ends, which produce the connection between the fastening element and the retaining plate.

Advantageously, in the interior of the housing forming the retaining plate, a pair of cables is provided, which are guided respectively through a pair of apertures at a distance apart from one another. The retaining plate can then, for example, be substantially in the shape of a rectangular, internally hollow plate, which is provided in each of its corner areas with an aperture from which a cable end exits and is joined to the retaining element, wherein two cable ends respectively belong to a single cable which is guided over rollers in the interior of the retaining plate housing.

Additionally, it is advantageous when the base of the cavity which, in the preferred embodiment, is located at a distance from a wall of the motor vehicle situated behind it, is provided with apertures in substantially the same relative arrangement as the apertures in the retaining plate, through which the ends of the elastic elements, that is to say cables, are fed. The cable ends are then also fed through the apertures in the base of the cavity of the fastening element, as these apertures align with the corresponding apertures in the retaining plate, and the cable ends are then fixed on the rear side of the base of the cavity.

For this purpose, in the preferred embodiment of the invention, the ends of the elastic elements are gripped between two plate-like plastics elements which can be joined together in a clip-like manner. The corresponding apertures in the base of the cavity can then be configured in an advantageous manner in a slit shape in order to feed through the plate-like plastics clips. With the embodiment latterly described it is then possible to grip the cable ends, which are lead through the apertures in the retaining plate, between the two plate-like parts of the plastics clip, and subsequently to insert these plastics plates together with the gripped cable ends through the apertures in the base of the cavity. Behind the aperture, the plate-like plastics elements are tipped over and are pulled by the tensile force of the elastic elements towards the back wall of the cavity and retained so that they can no longer slip back through the slit-like apertures. This embodiment is particularly easy to install.

Furthermore, an embodiment of the invention is preferred in which the retaining plate is provided with a handle by which it can be taken hold of and pulled out of the recess of the fastening element. When the retaining plate is configured as a housing which necessarily has a certain thickness, this handle can be provided in a recess or cavity in the external wall of the retaining plate, so that the handle also does not, or does not substantially project beyond the external plane of the retaining plate.

Figure 2:
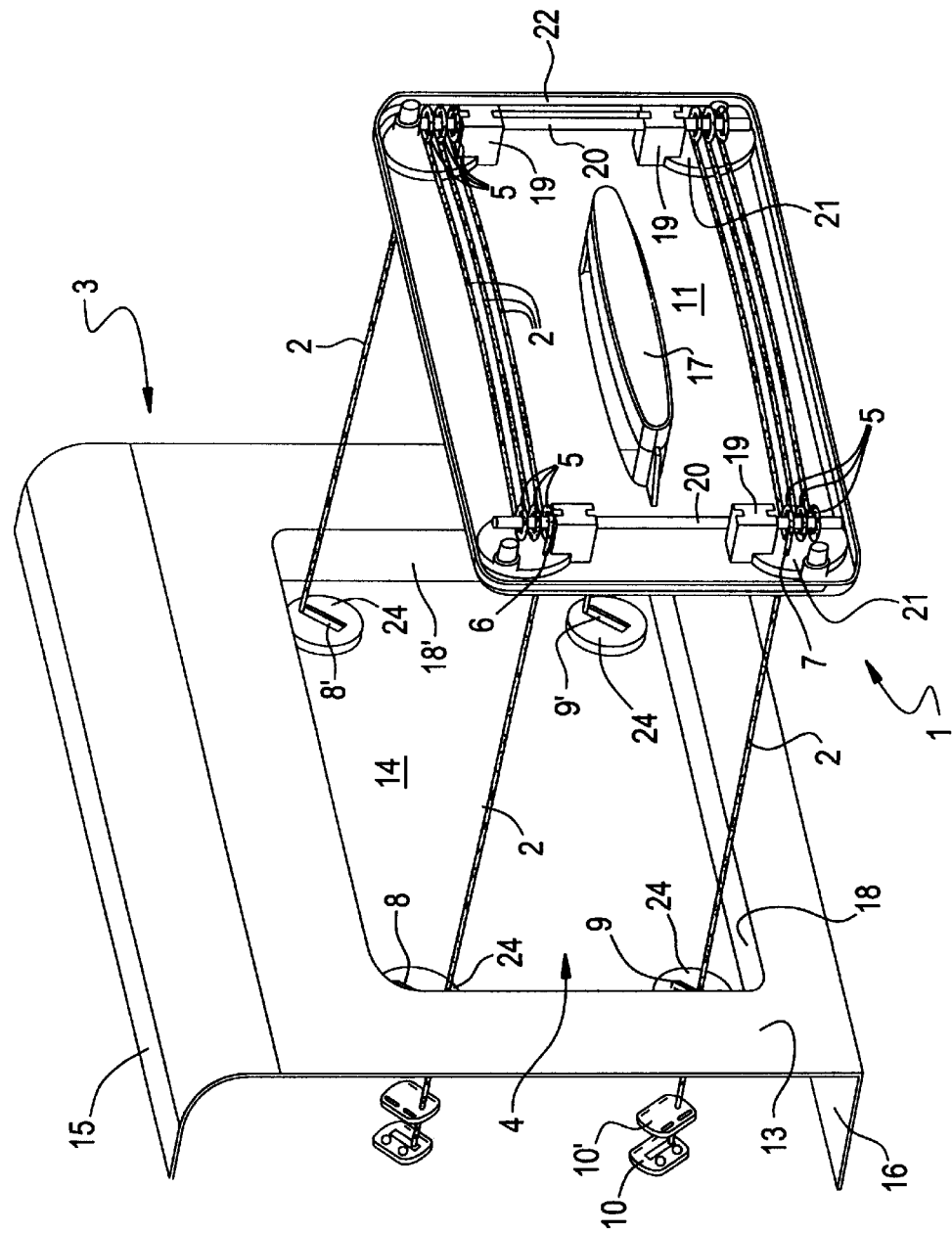

Further advantages, features and possibilities for applications of the present invention will become clear from the following description of a preferred embodiment and the attached drawings. These show in:

FIG. 1 a retaining plate with a fastening element and elastic elements in a perspective exploded illustration, and FIG. 2 an illustration similar to FIG. 1, wherein however the cover of the retaining plate configured as a housing is omitted.

FIG. 1 shows a retaining plate 1, which is retained by means of elastic cables 2 to a fastening element 3, and can be pulled away from it by increasing the elastic tension of the cable 2. The fastening element 3 is provided with a substantially rectangular cavity 4, which is dimensioned such that the retaining plate 1 can be received in this cavity 4, terminating more or less flush with the surface 13 of the fastening element 3.

The fastening element 3 can be manufactured from either plastics or metal and has the basic shape of a flat plate with angles 15, 16 on the top and bottom edge of the plate. The side edges are shown open in this case, but could equally be closed. The top angle 15 is shown in this instance with a very rounded transitional curve, which could be adapted, for example, to the shape of an internal lining or internal wall of a motor vehicle. The cavity 4 is provided with a base or bottom 14 and side walls 18, 18'. The base or bottom 14 does not necessarily have to be present but instead could, for example, also be formed by the internal wall of a motor vehicle. The side walls 18, 18' are necessary in all cases so that stowed items do not slip behind the fastening element 3 and thereby disappear behind the lining of a motor vehicle. The fastening element 3 can be mounted either in the orientation shown or rotated by 180° or by 90°, and it is preferably set into the interior lining of a motor vehicle so that its front surface 13 terminates flush with the front surface of the interior lining of a motor vehicle or with the rear wall of a seat or bank of seats. The angles 15, 16 can additionally be used to fix the fastening element 3 onto flanges or the like which for their part are attached to the vehicle. The angles 15, 16 can also be angled again on their free edges for the purpose of fastening when fastening to surfaces parallel to the front surface 13 is made easier in this way.

The retaining plate 1 is a hollow, double-walled plate as can be seen particularly clearly with reference to FIG. 2. The external shape of the retaining plate 1 is substantially that of a flat, rectangular parallelepiped with rounded corners, which fits exactly into the correspondingly shaped cavity 4 of the fastening element 3. In addition, the elastic cables 2 are dimensioned such that when no items are stowed with the aid of the plate, the retaining plate 1 is pulled completely into the cavity 4 until its ground area lies on the base or bottom 14 of the cavity or on the corresponding reinforcing bases 24 of the apertures 8, 8', 9, 9'. The retaining plate 1 is composed of a base part 11 and a cap-like cover 12. On the bottom part 11 a handle is attached in the centre, and where possible integrally with the bottom part 11, which projects perpendicularly with respect to the bottom part 11. In the corner areas of the bottom part 11 reinforcing bases 21 are provided, which are provided with access apertures 6, 7 which also extend through the bottom part 11. On the bases 21 on additional blocks 19 rollers 5 are mounted on shafts 20, which serve to guide the elastic cables 2. The two ends of an elastic cable 2 are each lead through a pair of upper apertures 6 and the two ends of a further cable 2 are lead through a pair of lower apertures 7, wherein in each case only one of the apertures 6 and 7 can be seen in FIG. 2. In each case two-and-a-half loops of cable of each of the two cables 2 are moved forwards and backwards over three pairs of rollers 5 between the rollers 5, wherein in each case one of the rollers 5 is arranged on the apertures 6, 7 such that the guided cable end can be lead in a substantially friction-free manner through the subsequent aperture 6 or 7.

The total cable length therefore corresponds approximately to five times the width of the retaining plate 1, more precisely to five times the distance between the pairs of rollers mounted on the shafts 20 which are in each case arranged in the proximity of the edge of the bottom part 11. For installation purposes, one end of the cable 2 is lead through the apertures 6 or 7 and gripped between the two disc or plate shaped parts of a plastics clip 10, 10'. One of the two plates of the plastics clip is additionally also provided with an aperture through which the ale end is lead, subsequently folded over and provisionally fixed between gripping parts and lastly finally gripped by pressing together of the two plastics plates, which are provided reciprocally with hooks and recesses or other latching elements for mutual connection.

Beforehand, the cables 2 were naturally lead over their corresponding pairs of rollers 5. However, it can be useful from the point of view of installation if in each case a pair of blocks 19 with the shaft 20 are removed from the reinforcing bases 21 in order to be moved nearer to the opposite shaft 20 and the opposite pair of blocks 19 so that the cable loops are correspondingly shortened and the cable ends are not under tension. In this manner it is easily possible to lead a cable end through the aperture 6 or 7 and to provide it with the plastics clip 10, 10'. When both ends of an elastic cable are provided with the plastics clips 10, 10', the blocks 19 can be fixed in their final position, wherein the cable 2 or the loops of cable are correspondingly tensioned. Subsequently, with further increase of the cable tension, the disc-like plastics clips 10, 10' are lead through the slit-like apertures 8, 8', 9, 9' in the base 21 on the base 14 of the cavity 4, wherein they tip over from the orientation at insertion at the rear of the base 14 and thus form a latch for the cable end behind the slit-like apertures 8, 8', 9, 9'.

As soon as the cable ends are fixed to the clips 10, 10' and the blocks 19 of the shafts 20 are fixed into their place, the cap-like cover 12 can be placed on the bottom part. Advantageously, the bottom part 11 is provided with a flanged edge or shoulder 22 running along its periphery, by means of which the edge of the covering cap 12 is guided. The covering cap 12 is also provided with a central cavity 23 with a recess 25, which is sufficiently large to flow the handle 17 to penetrate through and also to offer access for taking hold of the handle 17. In the embodiment shown according to FIG. 1, the cavity is configured as a long oval cavity 23, the walls of which run at an angle downwards in the direction of the bottom part 11, and terminate in a central access opening or recess 25 through which the handle 17 reaches.

As can easily be envisaged with reference to FIGS. 1 and 2, in order to stow items the handle 17 is taken hold of and pulled out of the cavity 4 in which it is for the time being held under the elastic tension of the elastic cables 2. Subsequently the items to be stowed are arranged and held in the cavity 4 or in the gap between the retaining plate 1 and the fastening element 3. Subsequently the retaining plate 1 can be drawn by means of the elastic cables 2 onto the items to be stowed. If the items are too big to be received completely in the cavity 4, then the pressure of the retaining plate 1 against the items, and their position on the edges of the cavity, serves to hold the items in a manner substantially without slipping.

What is claimed is:

1. A stowing aid for the interior of motor vehicles, comprising a retaining plate (1) which is connected by means of a plurality of elastic elements, which are arranged at least in part in the proximity of a periphery of the retaining plate (1), to a fastening element (3) attachable in said interior of the motor vehicle, towards which the retaining plate (1) is pulled by means of tensile force of the elastic elements, wherein the fastening element (3) attachable in the interior of the motor vehicle is provided with a recess (4) for receiving the retaining plate (1).

2. A stowing aid according to claim 1, wherein the depth of the recess is matched to the depth of the retaining plate (1) such that it terminates substantially flush with an external surface (13) of the fastening element (3).

3. A stowing aid according to claim 1, wherein the fastening element (3) is in the form of a plate which is angled towards one side on two opposite edges and in which the recess is configured as a cavity (4) with a base (14) and a depth.

4. A stowing aid according to claim 2, wherein the fastening element (3) is in the form of a plate which is angled towards one side on two opposite edges and in which the recess is configured as a cavity (4) with a base (14) and a depth.

5. A stowing aid according to claim 3, wherein a length of angled edge sections (15,16) perpendicular to the front plate surface (13) of the fastening element (3) is greater than the depth of the cavity (4).

6. A stowing aid according to claim 4, wherein a length of angled edge sections (15,16) perpendicular to the front plate surface (13) of the fastening element (3) is greater than the depth of the cavity (4).

7. A stowing element according to claim 1, wherein the retaining plate (1) is configured as a closed housing, which serves as a storage space for a section of each of the elastic elements.

8. A stowing element according to claim 6, wherein the retaining plate (1) is configured as a closed housing, which serves as a storage space for a section of each of the elastic elements.

9. A stowing aid according to claim 7, wherein the elastic elements are cables (2), which are guided over rollers (5) in the housing.

10. A stowing aid according to claim 8, wherein the elastic elements are cables (2), which are guided over rollers (5) in the housing.

11. A stowing aid according to claim 9, wherein each end of each cable (2) is guided from one of two apertures (6,6') at a distance apart in the retaining plate (1) and is fixed to or in the proximity of the fastening element (3), wherein the cable (2) runs inside the housing between the two apertures (6,6') in the housing over rollers (5).

12. A stowing aid according to claim 10, wherein each end of each cable (2) is guided from one of two apertures (6,6') at a distance apart in the retaining plate (1) and is fixed to or in the proximity of the fastening element (3), wherein the cable (2) runs inside the housing between the two apertures (6,6') in the housing over rollers (5).

13. A stowing aid according to claim 11, wherein cables (2) are configured as a pair of cables guided respectively through a spaced pair of apertures (6, 6', 7, 7').

14. A stowing aid according to claim 11, wherein cables (2) are configured as a pair of cables guided respectively through a spaced pair of apertures (6, 6', 7, 7').

15. A stowing aid according to claim 13, wherein a base (14) of the cavity (4) is provided with apertures (8, 8', 9, 9') which are provided in substantially the same relative arrangement as the apertures (6, 6', 7, 7') in the retaining plate (1), through which the ends of the elastic elements are led.

16. A stowing aid according to claim 14, wherein a base (14) of the cavity (4) is provided with apertures (8, 8', 9, 9') which are provided in substantially the same relative arrangement as the apertures (6, 6', 7, 7') in the retaining plate (1), through which the ends of the elastic elements are led.

17. A stowing aid according to claim 15, wherein the ends of the elastic elements configured as cables (2) are gripped between two plate-shaped plastics elements (10, 10') which can be clipped together.

18. A stowing aid according to claim 16, wherein the ends of the elastic elements configured as cables (2) are gripped between two plate-shaped plastics elements (10, 10') which can be clipped together.

19. A stowing aid according to claim 17, wherein the apertures (8, 8', 9, 9') in the cavity (4) are configured as slits for the passing through of the plate-shaped plastics elements (10, 10').

20. A stowing aid according to claim 18, wherein the apertures (8, 8', 9, 9') in the cavity (4) are configured as slits for the passing through of the plate-shaped plastics elements (10, 10').

21. A stowing aid according to claim 1, wherein the fastening element (3) is configured as a part of the interior lining of a motor vehicle.

22. A stowing aid according to claim 4, wherein the area of the base (14) of the cavity (4) is reinforced by base reinforcements (24).

23. A stowing aid according to claim 4, wherein the retaining plate is reinforced by retaining plate reinforcements (21).

* * * * *

UNITED STATES PATENT AND TRADEMARK OFFICE
CERTIFICATE OF CORRECTION

PATENT NO.   : 6,003,926
DATED        : December 21, 1999
INVENTOR(S)  : Lucas Labeur It is certified that error appears in the above-identified patent and that said Letters Patent is hereby corrected as shown below:

Change the dependency of Claim 14 from "11" to -- 12 --.

Signed and Sealed this

Twelfth Day of June, 2001

*Attest:*

NICHOLAS P. GODICI
*Attesting Officer*   *Acting Director of the United States Patent and Trademark Office*